United States Patent
Li et al.

(10) Patent No.: US 11,614,887 B2
(45) Date of Patent: Mar. 28, 2023

(54) METHOD AND SYSTEM FOR ACCELERATING STORAGE OF DATA IN WRITE-INTENSIVE COMPUTER APPLICATIONS

(71) Applicant: CORVIL LIMITED, Dublin (IE)

(72) Inventors: Guofeng Li, Dublin (IE); Ken Jinks, Dublin (IE); Ian Dowse, Dublin (IE); Alex Caldas Peixoto, Dublin (IE); Franciszek Korta, Dublin (IE)

(73) Assignee: CORVIL LIMITED, Dublin (IE)

( * ) Notice: Subject to any disclaimer, the term of this patent is extended or adjusted under 35 U.S.C. 154(b) by 0 days.

(21) Appl. No.: 17/729,218

(22) Filed: Apr. 26, 2022

(65) Prior Publication Data
US 2022/0253241 A1    Aug. 11, 2022

Related U.S. Application Data

(63) Continuation of application No. 16/911,905, filed on Jun. 25, 2020, now Pat. No. 11,334,285.

(51) Int. Cl.
*G06F 3/06* (2006.01)
(52) U.S. Cl.
CPC .......... *G06F 3/0656* (2013.01); *G06F 3/0613* (2013.01); *G06F 3/0619* (2013.01); *G06F 3/0653* (2013.01); *G06F 3/0683* (2013.01)

(58) Field of Classification Search
CPC .... G06F 3/0656; G06F 3/0653; G06F 3/0683; G06F 3/0613; G06F 3/0619
See application file for complete search history.

(56) References Cited

U.S. PATENT DOCUMENTS

| | | |
|---|---|---|
| 2010/0281230 A1 | 11/2010 | Rabii |
| 2013/0145077 A1 | 6/2013 | Huang |
| 2013/0185488 A1 | 7/2013 | Talagala |
| 2020/0159419 A1 | 5/2020 | Li |

FOREIGN PATENT DOCUMENTS

GB    2491004 A    11/2012

OTHER PUBLICATIONS

European Search Report for EP Application No. 20209927.1 dated May 12, 2021; 12 pages.
Moon, et al., "Adaptive policies for balancing performance and lifetime of mixed SSD arrays through workload sampling" 32nd Symposium on Mass Storage Systems and Technologies (MSST), IEEE, May 2, 2016; pp. 1-13.

*Primary Examiner* — Mark A Giardino, Jr.
(74) *Attorney, Agent, or Firm* — Schwabe, Williamson & Wyatt, PC

(57) ABSTRACT

A method of optimising a service rate of a buffer in a computer system having memory stores of first and second type is described. The method selectively services the buffer by routing data to each of the memory store of the first type and the second type based on read/write capacity of the memory store of the first type.

22 Claims, 6 Drawing Sheets

METHOD AND SYSTEM FOR ACCELERATING STORAGE OF DATA IN WRITE-INTENSIVE COMPUTER APPLICATIONS

CROSS-REFERENCE TO RELATED APPLICATIONS

This application is a continuation of U.S. application Ser. No. 16/911,905, filed Jun. 25, 2020, the entire disclosure of which is incorporated herein by reference.

FIELD OF INVENTION

The invention relates to methods for accelerating writing and reading of data to and from persistent storage media in computer systems. In particular, the invention relates to methods for accelerating storage I/O by caching data on storage media that is fast but relatively expensive and has low write-endurance. The invention particularly describes a method and system for employing fast, low write-endurance storage drives to improve read and write performance in write-intensive computer applications, without compromising drive lifespan.

BACKGROUND

Solid-state drives (SSDs) have higher I/O throughput than mechanical hard disk drives (HDDs), making them an attractive technology choice for I/O intensive computing workloads. However, SSDs are also currently more expensive per unit of storage, typically have lower storage capacity per drive, and have lower write-endurance than HDDs. These trade-offs have spurred development of techniques to enable use of SSDs as cache storage for a HDD-based store, in configurations that provide some or all the benefits of both. Examples of SSD-caching technologies include Intel's Smart Response Technology, Microsoft's Storage Space Direct, Apple's Fusion Drive, and the open-source bcache software package used in the Linux operating system.

Write-intensive computer applications, such as network packet-capture and live video data capture, are among those which require high storage I/O throughput. In these applications, data arrives continuously in a high bandwidth stream and must be faithfully written to persistent storage, from where it may later be exported for examination. Many individual storage drives may be needed to keep up with the incoming data, especially during occasional surges in the data rate, or during periods when the system is busy exporting data. A large amount of storage capacity may be needed to retain data long enough for examination. Combining SSDs and HDDs to provide both high I/O throughput and large storage capacity would therefore be an attractive option for these applications.

However, continuously writing to SSDs at the rates required in these applications causes drives to wear out quickly. Individual SSD drives can support only a certain volume of writes over their lifespan, commonly specified as a Terabytes Written (TBW) or Petabytes Written (PBW) rating, due to limitations of the underlying NAND flash technology on which they are based. This limits the average rate at which data can be continuously written to the device while maintaining an acceptable minimum lifespan. Sustained full-lifetime average write-rates for SSDs commonly available today are very low compared with the data-rates in network packet capture applications, for example. Use of SSDs in these applications would therefore require a large number of drives and/or frequent drive replacement.

Consider, for example, a network packet capture application that is capturing data from both directions of a 100 Gbps network link, where the link is 25% utilized on average. This application will need to write data to storage at an average rate of 50 Gbps (2×100 Gbps×25%) on a continuous basis. In comparison, an SSD drive with a PBW rating of 20 (meaning that you can write 20 PBytes of data to this disc and typical of today's models) and a target lifespan of 5 years can write data at an average rate of just 1 Gbps (20 PB/5 years) over its full life.

Existing caching technologies that combine SSD and HDD storage do not solve the problem of SSD wear, because in a continuous write-intensive setting the methods they use to manage data-writes either write all of the data to SDD, or very little of it. Methods of directing data-writes provided by existing techniques include:

Write-through caching: in this approach all incoming data is written to both SSD and HDD storage. This policy does not limit the volume of data written to SSD and is constrained by the inherent feature of non-volatile memories that are currently used in SSD. It is faster to write to these types of devices but their endurance is a limiting factor for write intensive events.

Write-back caching: all incoming data is written first to SSD storage, and later copied or transferred to HDD. This policy does not limit the volume of data written to SSD. in this way it doesn't work for environments where large volumes of data are captured continuously. As referenced above, SSDs have limited write endurance—not a problem for traditional data environments where people only write data sporadically however where you write continuously you get limited lifetime—1-2 years, not the 5 years that is a desired metric within the industry.

Write-around caching: under this policy all incoming data is written to HDD only, and the SSD cache is used only to accelerate reads. Under this policy the application cannot benefit from SSD caching to improve write performance.

Mixed write-back and write-around: under this policy certain data-writes that can be written efficiently to HDD, such as long sequential data-writes, are detected and directed to HDD only. Other data-writes are directed to the SSD cache. In write-intensive applications most data-writes are long sequential writes, therefore under this policy the SSD cache will be little used and will provide no benefit.

It will be appreciated therefore that there continues to exist a need for a method and system for accelerating storage of data in write-intensive computer applications.

SUMMARY

Using an understanding that the lower write-endurance of SSDs implies that a continuous write-intensive application should not write all incoming data to SSD, but that such an application can still benefit from SSD caching by using it in combination with HDD only during temporary periods of high demand for storage I/O, the present inventors have developed a new method of caching that allows a fast, low write-endurance storage technology such as SSD to be used as a cache in a write-intensive computer application, without compromising drive lifespan. Per the present teaching, data is stored in a manner that avoids writing all the incoming data to SSD, using an SSD cache instead to provide additional data-writing capacity only during periods when the main HDD storage system is unable to keep up with the incoming data rate, or during periods when the HDD store is busy responding to requests for data export. In this way the present teaching provides an approach that improves the maximum rate at which data can be captured and improves system responsiveness to data export requests, while maintaining acceptable cost in respect of the number and lifespan of SSDs required.

Per the present teaching, during periods of high data volume storage, some of the data may be written to SSD and the rest to HDD, thereby increasing its maximum achievable write-rate. During other periods when demand for storage is lower, the application may write all incoming data to HDD only, thereby preserving the useful lifespan of its SSD drives.

Applications of the present teaching are particularly advantageous in high-volume data settings such as HD video streaming, market data transfer, and scientific computing where large amounts of data may be recorded for the purpose of monitoring usage, performance or security.

Accordingly, there is provided a method and system as detailed in the claims that follow. A computer program is also provided.

DETAILED DESCRIPTION OF THE DRAWINGS

There now follows a description referencing FIGS. 1 to 6 which is provided to assist in an understanding of the present teaching. It is not intended to limit to the specifics of what is herein described except as may be deemed necessary in the light of the claims that follow.

Figure 1:
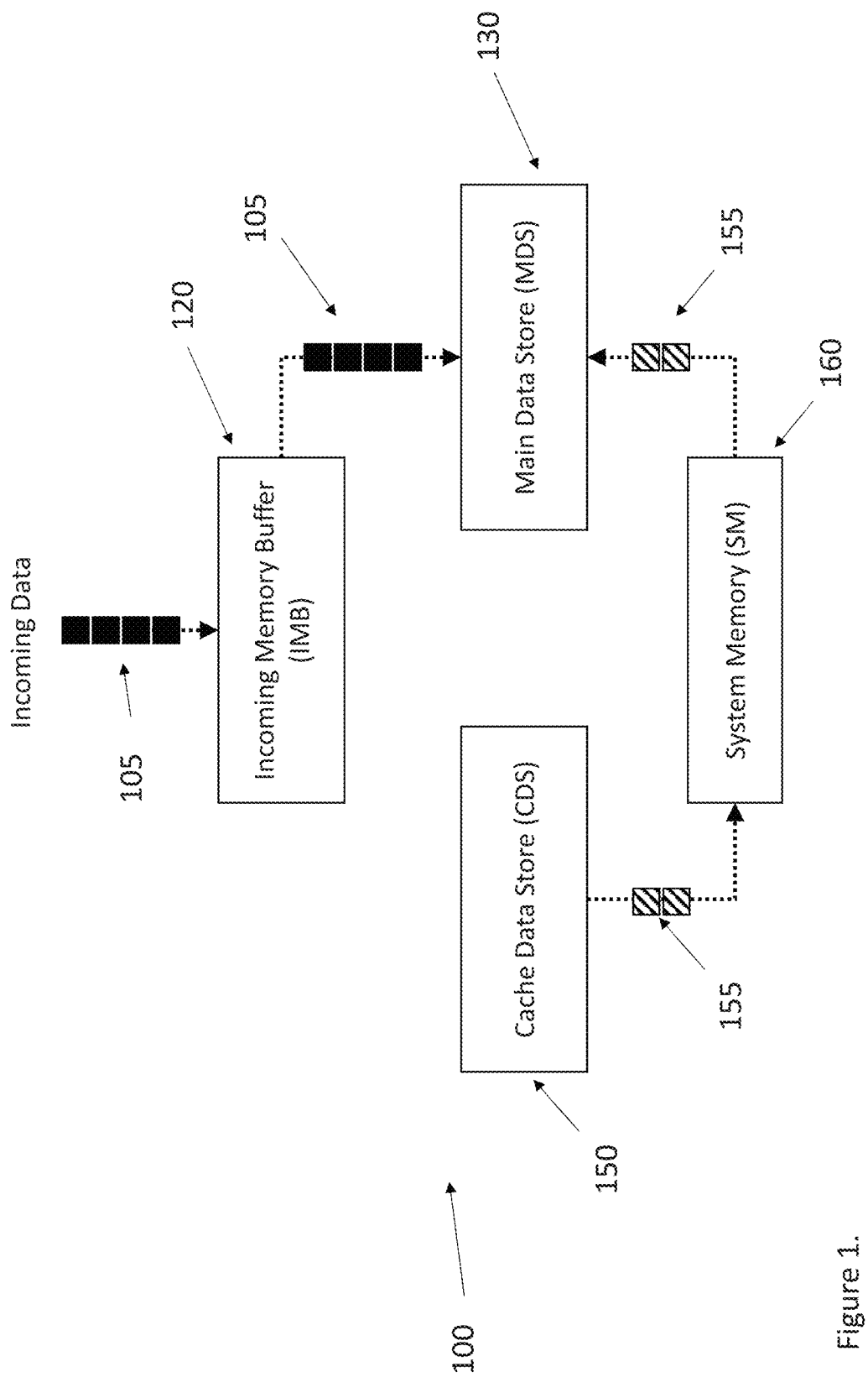
FIG. 1 shows application data flows in a system in accordance with the present teaching when an accelerated capture mode is not active.

FIG. 1 shows application data flows in a system 100 configured in accordance with the present teaching. In the arrangement of FIG. 1, the system comprises a first memory store or memory component 130 of a first type and a second memory store or memory component 150 of a second type. The first type is preferably an electromechanical type memory store or data storage device such as those known in the art as hard drive disks, HDD, that uses magnetic storage to store and retrieve digital data. It is typically a non-volatile memory hardware device. The second type is preferably a non-electromechanical type memory store or data storage device such as those provided by solid state drives, SSD, that provides a non-volatile storage media that stores persistent data on solid state flash memory.

Within the present disclosure, the memory component of the first type will be referred to as the Main Data Store, MDS, 130 whereas the memory component of the second type will be referred to as the Cache Data Store, CDS, 150.

The system is configured to use the memory resources of the CDS as required. In the configuration of FIG. 1, the CDS 150 is not used as a destination for incoming data. In this schematic, data that is arriving into the system, incoming data 105, is represented by solid blocks, whereas data that is being written back from the system, write-back data 155, is represented by the hashed boxes. The data being analysed can originate from any network or networks, but it will be appreciated from the following that a system and method in accordance with the present teaching has particular application in high-volume networks such as those associated with network packet-capture and live video data capture.

In this configuration, the system comprises a first memory component 120 configured as an incoming memory buffer, IMB. The IMB may, for example, be one or more designated areas in main system memory or device memory residing on standard computer RAM. A data stream 105 that is being analysed, the incoming data 105, is received temporarily into the IMB from where it is transferred directly to the Main Data Store, MDS, 130. The MDS may for example be one or more mechanical HDDs, with associated drive controllers and interfaces. In this configuration, the volume of the incoming data 105 at specific points in time is determined as being within the service capacity of the MDS, i.e. the MDS's current read/write operations are not operating at determined threshold values for processing the incoming data. It will be appreciated through the present application that whilst capacity can refer to a volume capacity—i.e. how much data a particular memory component can store—it can also refer to a service capacity—i.e. "the rate at which it can store data, i.e. volume per unit time". Unless expressly understood within the context presented as being a volume capacity, the usage of the term capacity within the present application is more typically referring to the service capacity characteristics.

The main data store, MDS, 130 can also be configured to act as a depository for data that is being retrieved from storage—write back data 155. Per FIG. 1, such data could be located within the cache data store, CDS, 150—having been previously written to the CDS at some time in the past. The CDS is characterized as having lower write endurance than MDS. As detailed above, it may for example be one or more industry standard SSDs, with associated drive controllers and interfaces.

In response to a user or system request, that data can be retrieved from the CDS 150 via a system memory, SM, 160, and written back to the MDS 130. This process is typically effected as an automatic process that is implemented whenever the network traffic rate is sufficiently low to allow it to be triggered. By effecting the process as a continuous automatic process that runs when there is data in the CDS the system can ensure that the CDS is drained during periods of reduced network traffic activity to ensure that space is freed up within the CDS for future periods of high network traffic activity such as in scenarios of bursty traffic.

FIG. 1 in this arrangement exemplifies usage of the system per the present teaching in a scenario where an incoming data rate is low and the MDS is not over-loaded and can as such serve the IMB at a sufficient rate to ensure that the IMB is capable of serving that network traffic. Such a scenario is typically also one which facilitates the implementation of a write-back mechanism where data from the CDS is transferred into the MDS without detracting from a primary functionality of the overall system to ensure that the incoming network traffic is processed.

In this arrangement of FIG. 1, it will be appreciated that the cache data store, CDS, is accessed through system memory 160 and not read directly from the IMB. It will be appreciated that the nett result of this transfer is a transfer from CDS to MDS, i.e. from the memory of the second type to the memory of the first and different type. This nett result of the migration of data is the important aspect to be considered here and the illustrated route of that data via the system memory simply reflects the fact that in typical computer systems memory components of two different types such as the exemplified MDS and CDS cannot talk to each other directly. To address this issue, this exemplary arrangement of data transfer between the two data storage components is effected through the intermediate usage of the system memory 160, with the data moved from the CDS into system memory first and then into MDS.

It will be appreciated that the IMB may be and typically is a designated area of system memory. In a system per the present teaching, data coming in from the external network is first read into memory storage residing on the network interface device, next transferred into a designated area of system memory, and then transferred to persistent storage (either CDS or MDS). In this example, the IMB can be thought of as comprising both the network interface device memory, and the designated area in system memory.

Figure 2:
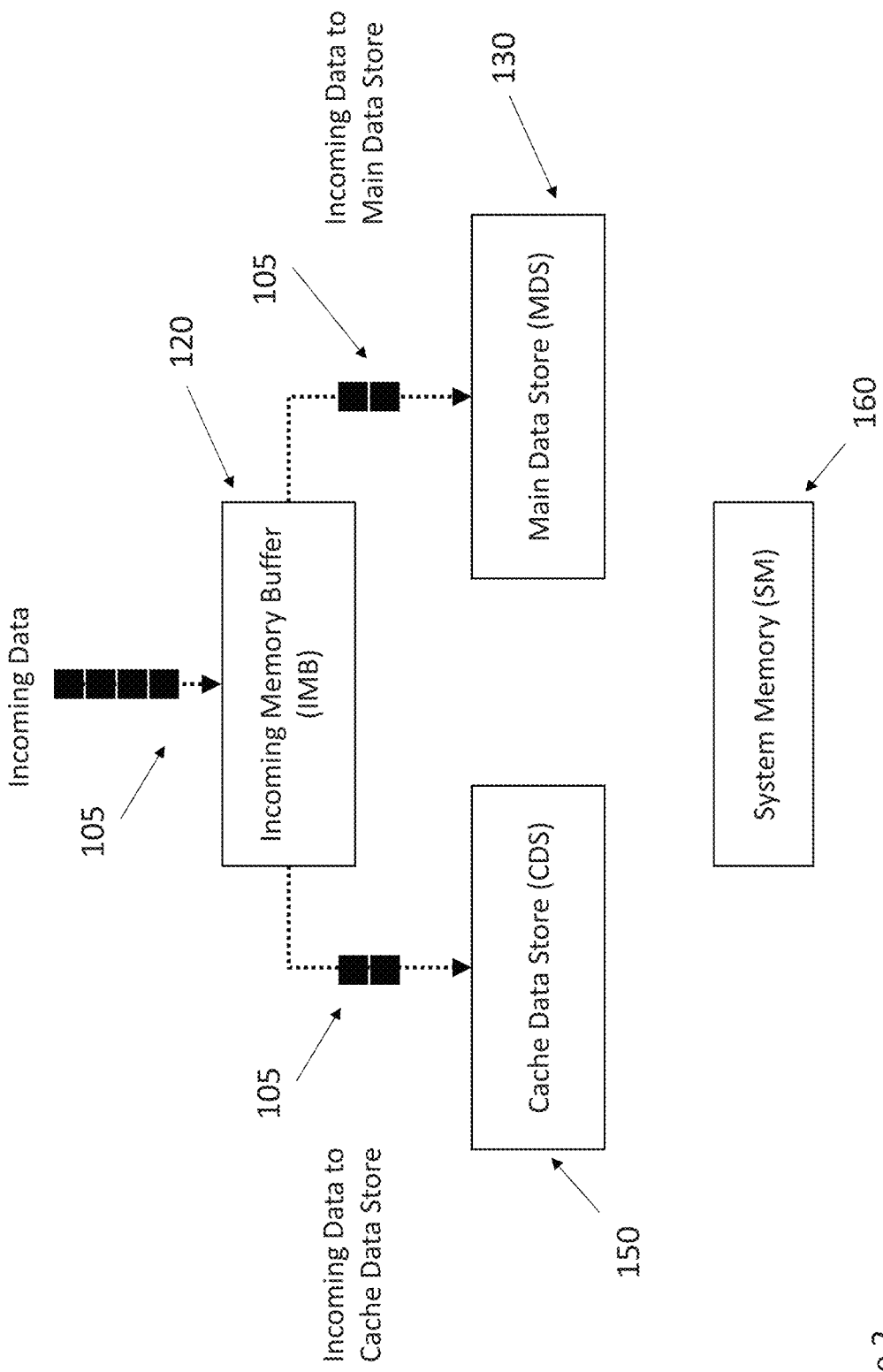
FIG. 2 shows application data flows in a system in accordance with the present teaching when an accelerated capture mode is active.

FIG. 2 shows a variation to the arrangement of FIG. 1, where data can be written directly to the CDS 150 from the IMB 120. This mode of operation is referred to an accelerated capture mode, ACM. It will be appreciated that as the CDS is typically provided by a non-electromechanical memory device, desirably by a solid state drive using integrated circuits to store data persistently, that its read and write characteristics are typically faster than the electromechanical operations of the MDS 130.

Per this accelerated capture mode, the incoming data 105 is received initially at the IMB 120, but, differently to the arrangement of FIG. 1, in this configuration segments of the data are then routed to each of the CDS 150 and the MDS 130. In this way the CDS can supplement the capabilities of the MDS to relieve the IMB 120 during periods of high network traffic occurrences. As will be appreciated from the discussion later, the proportion of the splitting of incoming traffic to each of the CDS and the MDS can be controlled. Such an accelerated capture mode advantageously allows the system to effectively store all incoming data, irrespective of the fact that it may be received at a rate that exceeds the normal write characteristics of the MDS. At the same time, as the IMB is provided with a data routing outlet into each of the CDS and the MDS, the buffer characteristics of the IMB do not have to be significantly different to that of the non-accelerated capture mode of FIG. 1.

The configuration of FIG. 2 facilitates an accelerated capture of data that is incoming into the system 100. The system can also be configured to effect an accelerated export of data from the system, an Accelerated Export Mode, AEM.

Figure 3:
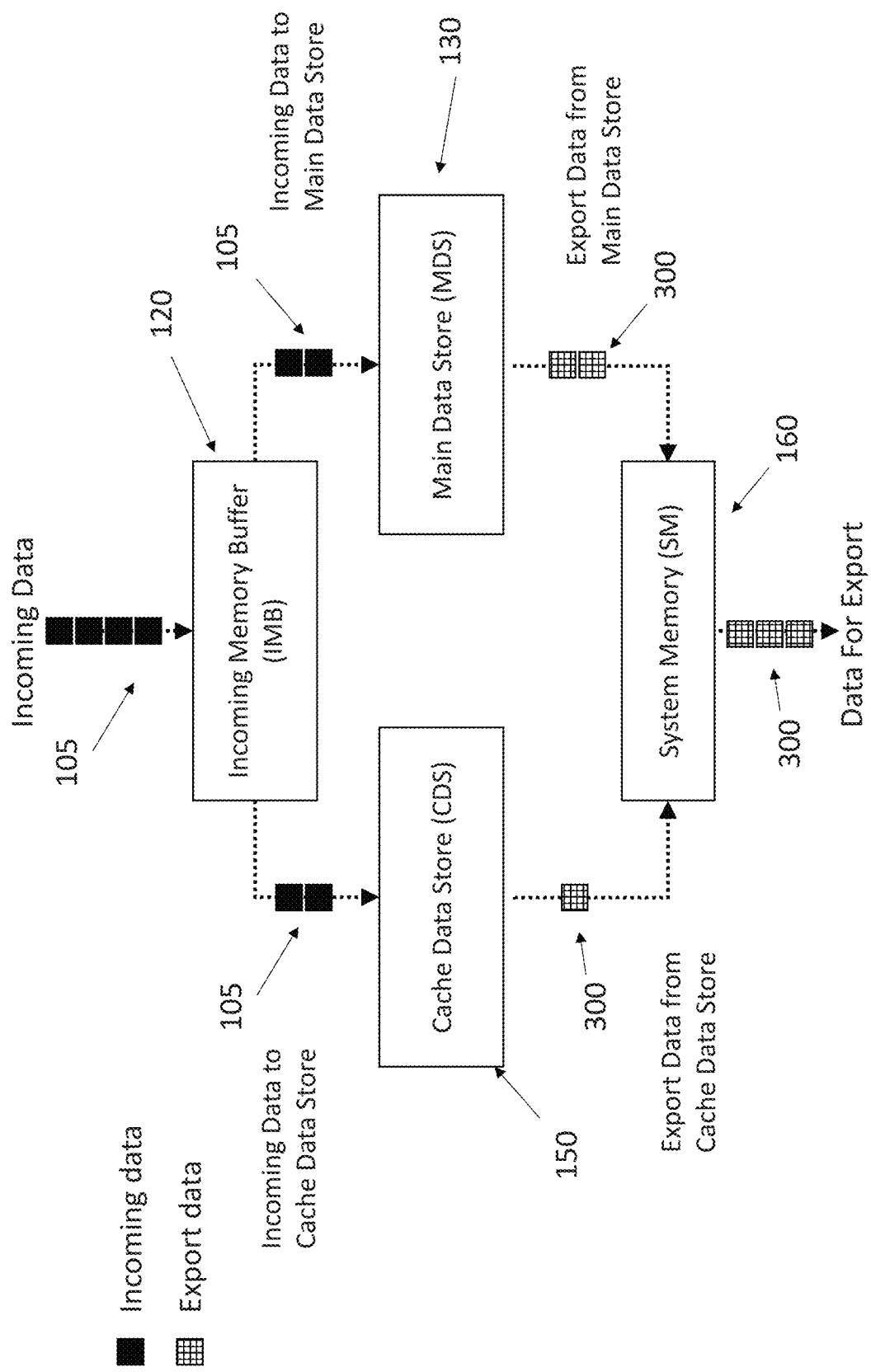
FIG. 3 shows application data flows in a system in accordance with the present teaching when an accelerated export mode is active.

FIG. 3 shows an exemplary arrangement during such an accelerated export. In this configuration a user or system requires access to data stored within the system whilst concurrently the system is receiving data for storage purposes, i.e. the system is concurrently reading data from storage for export and writing a portion of incoming data to CDS 150 in order to speed-up data export. Data for export, export data 300 represented by dotted lines, is read into system memory 160 from either the CDS 150 or the MDS 130, depending on where it is present. The data may then be processed by another application or exported to an external system. In order to free up MDS I/O bandwidth for export, a portion of the incoming data is written to CDS, and the remainder to MDS (solid lines). It will be appreciated that in this configuration the volume of incoming data 105 in itself is not sufficiently high to necessitate usage of the CDS 150 but given the limitations of the MDS in concurrently effecting read and write data operations, the CDS is used to facilitate concurrent or contemporaneous read/write operations of the MDS.

As was discussed above the controlled usage of the CDS 150 requires an optimisation routine that is cognisant of the physical limitations of the CDS for extended usage. It will be recalled that SSDs which are a preferred hardware component of the CDS have PBW ratings which define the total amount of data that can be written to a specific drive. With a defined PBW rating and a preferred lifetime of the drive, there is a trade-off between data written and longevity of usage.

Figure 4:
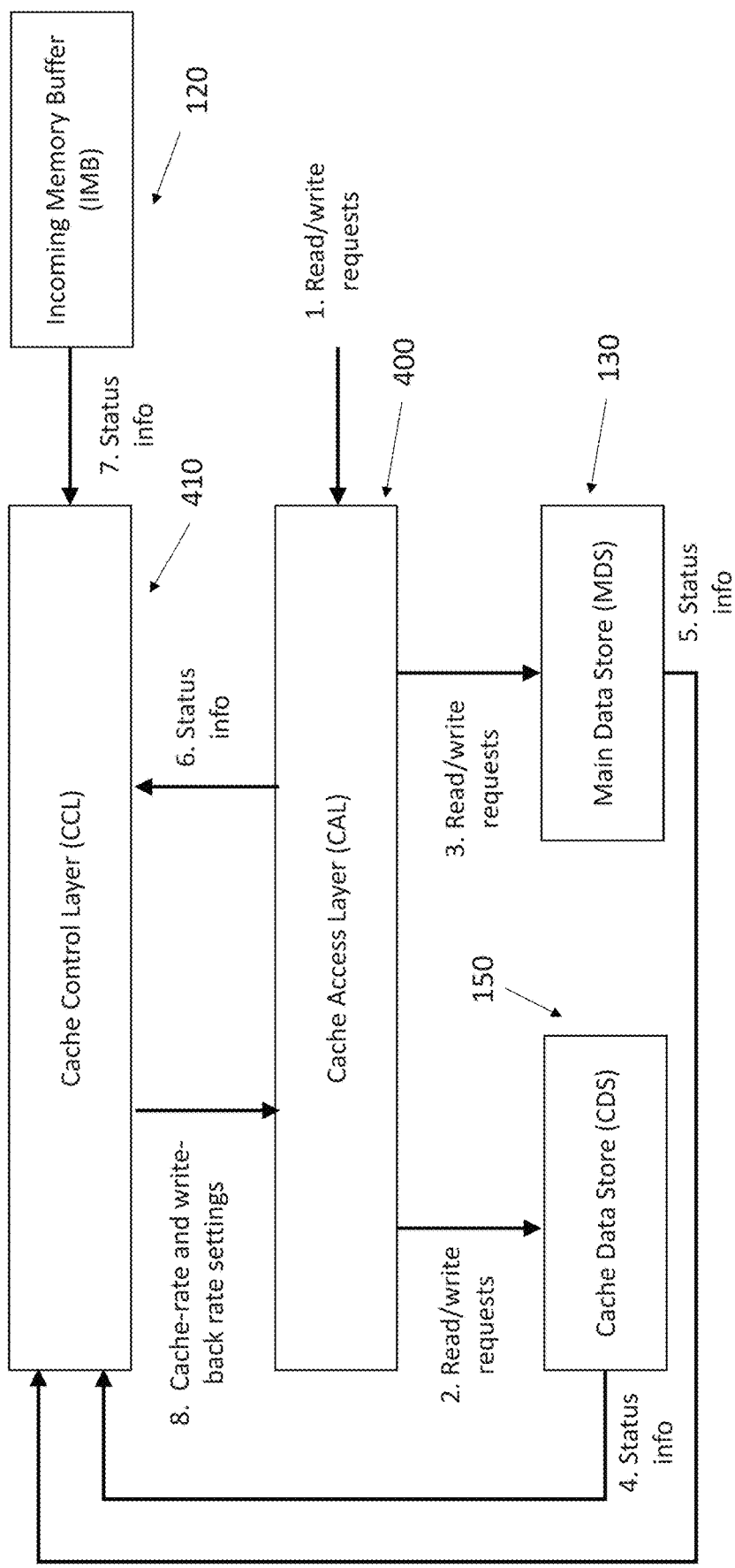
FIG. 4 shows an exemplary flow of control actions and information within a system configured in accordance with the present teaching.

FIG. 4 shows flows of control actions and information between components of a system in accordance with the present teaching. Read and write access operations, 130, labelled 1,2,3 in the figure), to storage media including the IMB 120, the CDS 150 and the MDS is controlled by a Cache Access Layer component, CAL, 400. The CAL component is in turn dynamically controlled by a Cache Control Layer component, CCL, 410, which configures certain cache-rate and write-back parameters or settings provided by the CAL, labelled 8 in FIG. 4. The cache-rate parameter may be specified, for example, as a fraction or percentage of incoming data that is to be written to CDS, with the remainder to be written to MDS.

This parameter can be dynamically updated or changed in response to usage of the system. This can for example be achieved by monitoring usage of the MDS memory store and adjusting the cache-rate parameter in response to that monitored usage.

This monitored usage may comprise at least one of data writing or data reading requests to the MDS memory store. In the event that the monitored usage indicates demand for accelerated reading of data from the MDS, the adjusting the cache rate parameter can effect an increased usage of the CDS memory store in response to that demand for accelerated reading.

The cache-rate parameter can also be adjusted in response to actual use or wear of the CDS memory store. It will be recalled that whilst these types of memories can support only a certain volume of writes over their lifespan and to optimise the usage of the CDS over extended periods, the present teaching may also provide for a monitoring of a wear-level parameter of the CDS memory store, the wear-level parameter being a value related to a lifetime storage capacity of the CDS memory store. By monitoring that wear-level parameter it is possible to then adjust the cache-rate parameter in response to variations in the monitored wear-level parameter.

The write-back rate may be specified as a number of units of data to be copied from CDS to MDS per unit time (when the CDS is not empty). The CCL component may use status information, labelled 4,5,6,7, from other system components, as part of its operations. The CAL component may for example be a modified version of an existing cache management solution implemented in hardware or software. The CCL component is typically a computer application implemented either in software or hardware.

Per the process flow of FIG. 4, the Cache Control Layer (CCL) 410 configures the Cache Access Layer (CAL) 400 to write a portion of incoming data to the Cache Data Store (CDS) 150 and the rest to the Main Data Store (MDS) 130. Data initially written to CDS may be later transferred to the MDS by the CAL. The portion of incoming data to be written to CDS, called the cache-rate, and the rate at which data is written back from CDS to MDS, called the write-back rate, are adjusted dynamically by the CCL 400 in order to keep up with the incoming data-rate, respond quickly to data export requests, and limit CDS 150 wear.

In this way it will be appreciated that the role of the Cache Access Layer 400 is to mediate access to the underlying storage media. The CAL presents an interface (labelled 1 in FIG. 4) to the rest of the system that allows data to be written to storage, retrieved from storage, and optionally deleted from storage. For example, it may present this interface in the form of one or more logical storage volumes. When receiving new data from the rest of the system for writing to storage, the CAL may initially write some of this data to CDS and the remainder to MDS (labelled 2 and 3 in FIG. 4). The CAL ensures that data initially written to the CDS is later copied to the MDS, a process called write-back. The CAL deletes data from CDS once it has been copied to MDS, freeing up space to be over-written with new data, and optimally is configured such that it does not copy data from CDS to MDS more than once. Write-back stops when the CDS is empty.

When requested the CAL retrieves data from storage, reading it either from CDS or MDS depending on where it now resides. The CAL never writes data already stored in MDS back into CDS—in other words, it does not use the CDS to cache reads, only writes. It will be appreciated that read-caching is a configurable set-up where data that is frequently needed can be copied from MDS into CDS, from where it can be read more quickly. Depending on the type of application this may or may not be required and as such a system and method per the present teaching may be configured to deactivate read-caching activities. It will be appreciated for example that such a deactivation of read-caching has application in data analytic scenarios were once data is stored, it is accessed only infrequently. By not enabling read-cache it is possible to reserve the full space of CDS for write-caching which is a more critical need.

It will be appreciated that in this way the CAL 400 manages the functions of one or more underlying SSD and HDD drives, which provide the capabilities of the CDS 150 and MDS 130 respectively. In this way it presents a single logical drive interface to the rest of the system for access to storage.

The CAL component of the present invention is configured to both provide a write-back capability where data is initially written to SSD storage and subsequently copied to the HDD store by a background process and also to define a maximum rate at which this happens based on write-back rate parameters of the CAL. In addition, the CAL 400 may be configured to control the cache-rate, as follows. The portion of data to be written to the CDS 150 may be specified as a value P between 0% and 100%. The CAL may alternate between writing incoming data to the CDS and MDS stores by writing the first P×B units of data to CDS, the next (1−P)×B units of data to MDS, the next P×B units to CDS, and so on. Here the parameter B may be any value greater than 1. The CAL may implement this rule, or another rule with similar effect, for all data-writes or at minimum for all sequential data-writes.

When the cache-rate parameter P is 0%, the system writes all incoming data to MDS as depicted in FIG. 1. When P is positive but less than 100%, data is written to both MDS and CDS, as shown in FIG. 2. When P is 100%, data is written only to CDS. Depending on the relative write capacity of MDS and CDS storage (a function of the number and characteristics of drives used), there will in general be an optimal value of P somewhere between 0% and 100% that optimizes the total combined write-rate of data to both storage sub-systems. This optimal value 'PMAX' can be determined for a given assembly of CDS and MDS drives, and may result from a calibration routine by varying the value of P while monitoring the total data write-rate when the system is under load. It will be appreciated that the value of PMAX may depend on the number of drives in use, and therefore may change over time in an operational system when drives fail or when new drives are added to the system.

In this way, it will be understood that the CCL can be configured to determine, periodically or continuously, appropriate values for the cache-rate parameter P and the write-back rate and configures the CAL accordingly. The CCL adjusts the cache-rate and the write-back rate according to the following general principles:

G1) Ensure, when possible, that the rate at which incoming data is written to storage is high enough to keep up with the incoming data-rate. This is achieved by increasing the cache-rate and/or reducing the write-back rate when a high incoming data-rate is detected. Increasing the cache-rate causes more incoming data to be written to CDS, while reducing the write-back rate frees up more I/O cycles for writing incoming data to MDS. Thus, these actions lead to an increase in the total write-rate for incoming data.

G2) Ensure that data written to CDS is transferred to MDS in a timely fashion in order to free space on the CDS for new data. This is achieved by increasing the write-back rate when the incoming data-rate is lower than the write capacity of the MDS. A higher write-back rate causes data to be moved more quickly from CDS to MDS.

G3) Avoid unnecessary CDS wear. The rate of wear can be reduced by writing less data to CDS, i.e. by reducing the cache-rate when the incoming data rate is low.

G4) Ensure that data can be read from storage rapidly enough to allow data exports to complete in a timely fashion. This is achieved by increasing the cache-rate and reducing the write-back rate when data exports are in progress. These actions reduce the amount of incoming and write-back data being written to MDS, thereby freeing up MDS I/O cycles for reading data. Most of the data required to respond to export requests will normally reside on MDS storage, because this is where all incoming data ends up.

G5) Preserve CDS expected lifespan. Eventually, CDS drives will fail due to wear, which may cause a sudden drop in the rate at which data can be written to storage. It may be desirable to achieve a more gradual decline in write capacity, especially in environments where conditions are unexpectedly adverse. This is achieved by detecting higher than expected rate of wear and adjusting system behaviour to make more conservative use of CDS storage.

Figure 6:
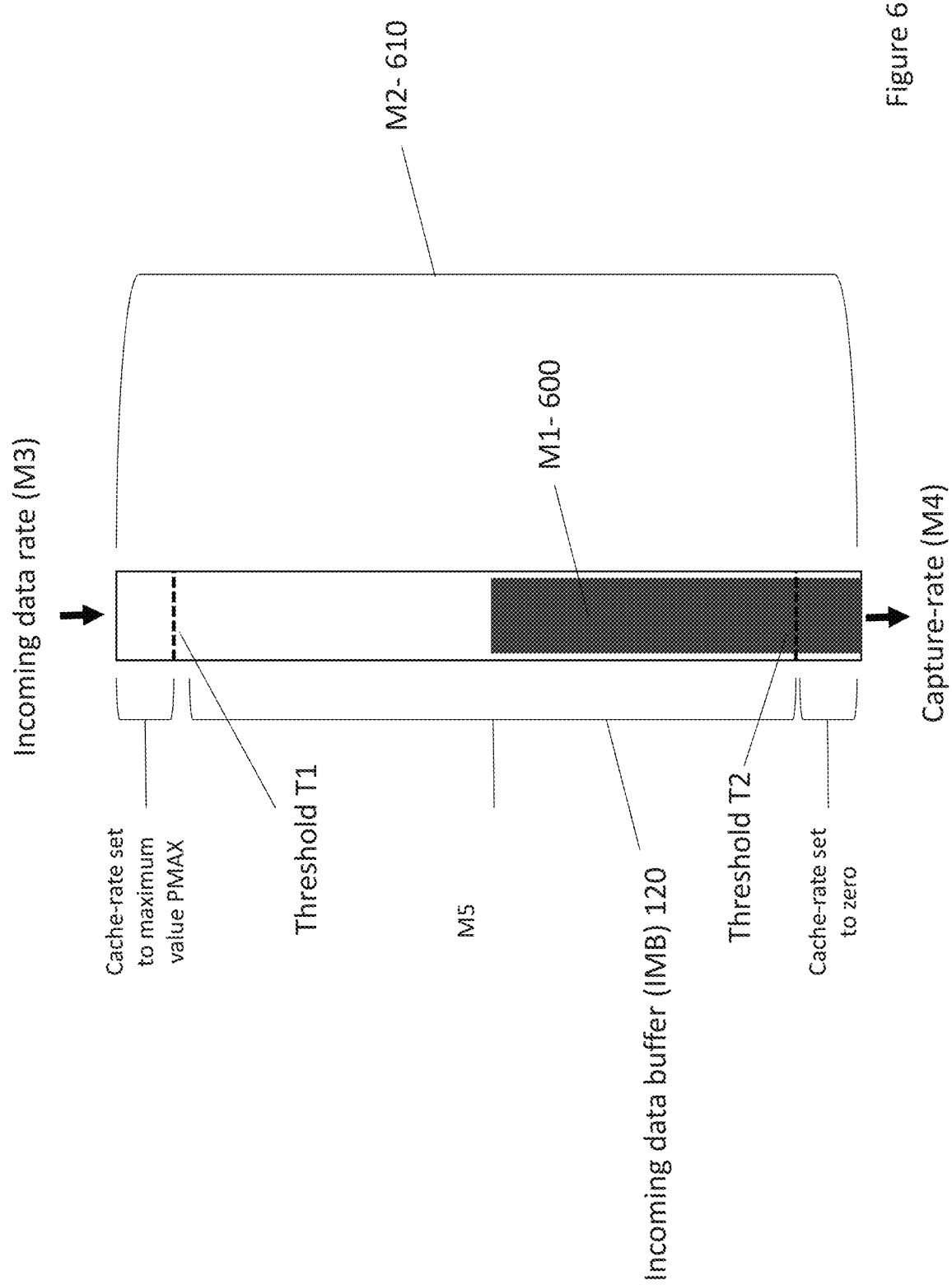
FIG. 6 illustrates how cache-rate adjustments can be determined from incoming data rate, buffer volume, and capture-rate in accordance with the present teaching.

As an example of how the CCL can be configured to operate to achieve these principles and with reference to FIG. 6, it will be understood that when determining values for the cache-rate and the write-back rate, the CCL may consider multiple factors including any of the following:

M1) The current volume 600 of data stored in the IMB. This volume may be determined, for example, by subtracting the volume of data removed from the IMB from the volume of data written to the IMB since power-on.

M2) The total amount 610 of the data that the IMB can store. This may be a fixed value, or it may be a value that varies depending on system resource allocation.

M3) The current rate of incoming data. This rate may be measured by counting the volume of data transferred into the IMB and dividing this value by the duration of time over which the data was transferred.

M4) The current capture or service rate. This is the rate at which incoming data is being written to storage (both CDS and MDS). This rate may be measured by counting the volume of incoming data written to storage and dividing this value by the duration of time over which the data was written. It will be appreciated that this value does not include write-back data written from CDS into MDS.

M5) The cache-rate parameter setting PMAX that maximizes combined write-rate capacity across both MDS and CDS. This parameter may be found offline using the procedure described above and is used to control M3-M4.

M6) The maximum possible rate of incoming data. In many cases the rate of incoming data will be limited by known factors such as network interface speeds. Otherwise, this parameter may be set as a system design value.

M7) The maximum rate at which data can be written to MDS storage. This value will depend on the number and characteristics of drives used in the MDS store. It can be determined either from manufacturer's specifications, or by testing the achievable write-rate under load.

M8) The current wear level of the CDS. This value is the percentage of initial CDS lifetime storage capability (e.g. Terabytes-Written or Petabytes-Written) that is no longer available due to drive wear. It is reported directly by many SSD devices, for example.

M9) the age or usage time of the CDS. This value may be measured, for example, by obtaining the total amount of time that CDS devices have spent in a powered-on state, which is reported by many SSD devices.

An appropriate cache-rate setting can be determined as follows. The volume of data in the IMB (M1) increases whenever the incoming data-rate (M3) exceeds the current capture-rate (M4). If M1 reaches the capacity of the IMB (M2) then the system will be forced to discard data due to lack of space in the IMB. Therefore, it is reasonable to set the cache-rate to its maximum value PMAX when M1 exceeds a pre-defined threshold T1, where T1<=M2.

When M1 is zero, then the incoming data-rate is less than the total capture-rate and the full capacity of the IMB is available to absorb any sudden surge in incoming data. Therefore, it is reasonable to set the cache-rate to zero when M1 is below a pre-defined threshold T2, where 0<=T2<T1, in order to minimize CDS wear.

When M1 is greater than T2 but less than T1, then the CCL may set the cache-rate in order to control the difference between the incoming data-rate (M3) and the current capture-rate (M4). This can be achieved using a Proportional-Integral-Derivative (PID) control algorithm, where the input to the PID controller is the difference between the measured values of M3 and M4 for each successive time interval, and the output from the PID is used to set the cache-rate (within the range defined by the lower limit of zero and the upper limit of PMAX).

An appropriate write-back rate setting can be determined as follows. Whenever the above rules determine a non-zero value for the cache-rate, indicating that writing to CDS is needed to control the IMB data volume and/or keep up with the incoming data-rate, then it is reasonable to set the write-back rate to zero to avoid placing additional load on storage. Otherwise, when the cache-rate is zero, the CCL may set the write-back rate parameter to a value that is positive, but limited in order to ensure that the MDS has sufficient capacity to keep up with both incoming and write-back data. The CCL can achieve this by again using, for example, a PID algorithm to control the difference between the incoming data-rate (M3) and the capture-rate (M4). The input to the PID algorithm is the difference between M3 and M4, and its output is used to set the write-back rate, within a range from zero up to a maximum value WMAX.

Adjustments to both the cache-rate and the write-back rate may be applied at any time but should be applied sufficiently often to allow the system to react quickly enough to prevent the IMB from filling with data when the current incoming data-rate exceeds the current capture-rate. For example, if the maximum possible rate of incoming data (M6) is 200 Gbps, the maximum MDS capacity (M7) is 20 Gbps, and the IMB has a capacity (M2) of 100 GB, then assuming no increase in cache-rate a sudden surge of incoming data would take at least M2/(M6−M7)=6.67 seconds to fill the IMB starting from an empty state. In this case it is desirable to update the cache-rate and write-back rate at intervals that are a fraction of 6.67 seconds.

When write-back is active, it reduces the capture-rate, by an amount up to the maximum write-back rate WMAX. In the example of the preceding paragraph, if write-back is active during a surge in incoming data, with write-back rate WMAX=10 Gbps, then the time taken to fill the IMB will be reduced to M2/(M6+WMAX−M7)=4.21 seconds. WMAX should therefore be set to ensure that this value is larger than the time interval between updates to the cache-rate and write-back rate.

The parameters of the PID controllers used to set the cache-rate and the write-back rate can be determined by experimentation, following standard procedures for PID controller design. To this end, it is useful to test the response of the system to sudden changes in input load. When the load increases to a level that requires a positive cache-rate for the system to keep up, the controller parameters should be chosen to ensure that the cache-rate increases quickly enough to prevent the IMB from filling up. When the load decreases, the controller may reduce the cache-rate gradually and aim to avoid overshoot and oscillation. Likewise, the write-back rate controller should aim to increase this parameter gradually when the capture-rate M4 is greater than the incoming data-rate M3. Given the importance of avoiding IMB overflow, it may be useful to apply different controller parameters depending on the current IMB data volume M1, for example to reduce cache-rate more cautiously whenever M1 is above a threshold T3 (where T2<T3<T1).

Acceleration of data exports, as specified in goal G4, can be achieved by setting the cache-rate to its maximum value PMAX, and the write-back rate to zero, whenever an export is in progress. When the export ends, these parameters can be restored to the values they had before the export started and then further updated according to the methods already described.

Figure 5:
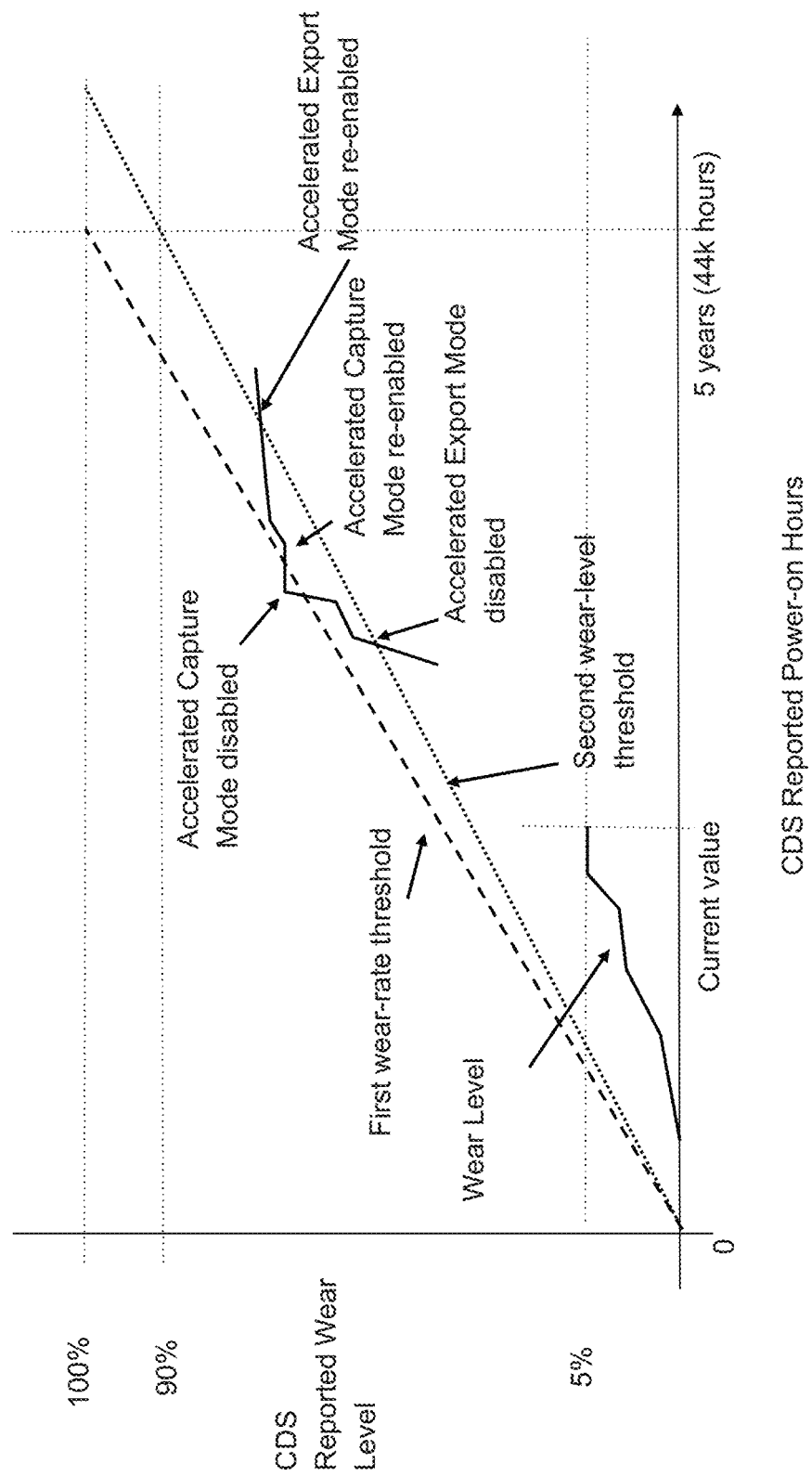
FIG. 5 shows how control of accelerated capture and export modes can be configured in accordance with a wear-limiting algorithm in accordance with the present teaching.

To preserve CDS longevity as required in goal G5, the CCL may monitor the current wear-level (M8) relative to age-dependent thresholds and alter the above described method of setting cache-rate depending on the values of these parameters. A graphical example of the underlying principles is shown in FIG. 5.

For this purpose, the CCL may calculate a first threshold value, called the wear-level capture threshold, and optionally a second threshold called the wear-level export threshold. The wear-level capture threshold is calculated by dividing the wear-level by the duration of time for which the CDS has been in use, represented for example by its total power-on time (M9). For example, if the target CDS lifetime is 5 years, the wear-level capture threshold is 20% by the end of first year, 40% by $2^{nd}$ year and so on. The wear-level export threshold is a percent (90%) of the wear-level capture threshold. Depending on the current values of wear-level and wear-level thresholds, the CCL may periodically (e.g. once per day) apply the following steps which have the effect of either enabling or disabling the use of the CDS for accelerating capture and exports:

1. If the current wear-level is less than the wear-level export threshold then enable use of the CDS for both capture and export acceleration and do not carry out the remaining steps 2-5 below.
2. Otherwise, if the wear-level is at or above the wear-level capture threshold value, then disable the use of the CDS for both capture and export acceleration. When CDS is disabled the cache-rate is always set to zero.
3. Otherwise, if the wear-level exceeds the wear-level export threshold value (e.g. 90% of the wear-level capture threshold) and is less than the wear-level capture threshold, then enable use of CDS for accelerating data capture but disable it for accelerating data export. In this case, the CCL does not change the cache-rate setting when a data export begins, although it may still set the write-back rate to zero (since write-back has no effect on CDS wear). All other adjustments to the cache-rate parameter continue to apply. The effect of this setting is to temporarily prevent caching from being used to speed up data exports, while still allowing it to be used when necessary to keep up with incoming data.
4. Otherwise, enable use of CDS for accelerating both data capture and data export, and continue updating the cache-rate and the write-back rate using the procedures already described.

The use of the wear-level export threshold is optional. If it is not used, then steps 1 and 3 in the above procedure are omitted.

These steps act as additional limits on the use of the CDS based on feedback regarding its wear-rate, thereby preserving its longevity in unexpectedly adverse conditions as required by goal G5. In addition, they illustrate how accelerating capture can be prioritized over accelerating data export, in circumstances where the use of caching for both purposes would incur an excessive wear-rate. An example of how the CDS wear-level may evolve over time under the control of this algorithm is shown in FIG. 5. Note that any disabling of CDS under steps 2 and 3 above is temporary, since both threshold values naturally increase over time. In this way the rate of wear of the Cache Data Store can be limited over time by enabling and disabling the use of Accelerated Capture and Export Modes based on the current wear level and total usage time reported by the CDS, according to a wear-limiting algorithm applied by the CCL. It will be appreciated that the system monitors usage of the CDS 150 and based on its projected deviation from a preconfigured wear rate threshold can then modify one or both of accelerated capture mode or accelerated export mode. It will be appreciated that the selective activation and deactivation of each of these modes can be dynamically modified on a predetermined frequency depending on usage parameters or requirements.

It will be appreciated that what has been described herein are exemplary embodiment of a system which incorporates an Incoming Memory Buffer 120 where arriving data is stored temporarily before being written to storage. The IMB consists of one or more designated areas in main system memory or device memory. Data may be written into the IMB by one or more software applications, or by DMA transfer from one or more devices, or directly by device hardware. Data is written from the IMB to the MDS and CDS components for storage. By having a memory store of a first type, the MDS, and a memory store of a second type, the CDS, where the second type is different to the first type, the system can be configured to selectively service the IMB memory buffer by selectively writing data from the memory buffer to each of the memory store of the first type and memory store of the second type. In this way the system can advantageously store incoming data, irrespective of the fact that it may be received at a rate that exceeds the normal write characteristics of the MDS. The CDS has faster write characteristics but lower write endurance than MDS and in this way it can be used temporarily to supplement the capacity of the MDS to absorb incoming received data. Once received that data can then be read back from the CDS into the MDS for longer-term storage or could indeed be stored within the CDS until required externally of the system. By monitoring the buffering characteristics of the IMB and then selectively activating usage of the CDS dependent on the clearing rate of the IMB, the system advantageously ensures that incoming data can be processed through the IMB across a variety of incoming conditions and other uses of the MDS.

Whilst exemplary arrangements of the system and method have been described to assist in an understanding of the present teaching modifications can be made without departing from the scope of the present teaching which is intended to be limited only insofar as is necessary in the light of the claims that follow.

The invention claimed is:

1. A method of controlling a service rate of a memory buffer in a system comprising a memory store of a first type and a memory store of a second type, the second type being different to the first type in having a lower write endurance, the system being configured to selectively service the memory buffer by selectively writing data from the memory buffer to each of the memory store of the first type and memory store of the second type, the method comprising:
   monitoring write operations to the memory buffer to identify the rate of incoming data to the memory buffer, the write operations being resultant from incoming data to the system, the memory buffer having a known capacity of data that it can store;
   monitoring a service rate of the memory buffer, the service rate being the rate at which the incoming data is written from the memory buffer to at least one of the memory store of the first type and the memory store of the second type;
   using the monitored write operations and service rate to dynamically determining a cache-rate parameter, the cache rate parameter identifying a proportion of the data in the memory buffer to be written to each of the memory store of the first type and the memory store of the second type, the determined cache rate parameter being varied to ensure that the service rate of the memory buffer is at least equal to the rate of incoming data to the memory buffer;

using the determined cache-rate parameter to selectively read the data from the memory buffer and write that data to one of the memory store of the first type and memory store of the second type.

2. The method of claim 1 wherein the cache-rate parameter is a variable parameter, a value of the variable parameter controlling the proportion of the data from the memory buffer that is written to each of the memory store of the first type and the memory store of the second type, the proportion varying from all of the data being written to the memory store of the first type and none to the memory store of the second type to all of the data being written to the memory store of the second type and none to the memory store of the first type.

3. The method of claim 1 wherein the cache-rate parameter has a determined optimum value that optimizes a total combined write-rate of data to each of the memory store of the first type and the memory store of the second type.

4. The method of claim 3 wherein the optimum value is a calibrated value determined by monitoring a total data write-rate when the system is under load.

5. The method of claim 1 wherein the determined cache rate parameter is dynamically varied to ensure that volume of data within the memory buffer is below the capacity of the memory buffer.

6. The method of claim 1 wherein the cache-rate parameter selectively controls the writing of data to the memory store of the second type to ensure that the memory buffer has sufficient service capacity to store the incoming data.

7. The method of claim 1 comprising periodically refreshing the cache-rate parameter, a frequency of refresh of the cache-rate parameter being based on a capacity of the memory buffer, a maximum data rate of incoming traffic and a service capacity of the memory store of the first type.

8. The method of claim 1 comprising defining a write back parameter, the write back parameter controlling a write back rate at which data is written back from the memory store of the second type to the memory store of the first type.

9. The method of claim 8 comprising periodically refreshing the write back parameter, a frequency of refresh being based on a volume capacity of the memory buffer, a maximum data rate of incoming traffic and a service capacity of the memory store of the first type.

10. The method of claim 9 comprising periodically refreshing the cache-rate parameter, a frequency of refresh of the cache-rate parameter being based on a capacity of the memory buffer, a maximum data rate of incoming traffic and a service capacity of the memory store of the first type, and wherein the frequency of refresh of the write back parameter is equal to the frequency of refresh of the cache-rate parameter.

11. The method of claim 10 comprising defining a maximum write-back rate, the maximum write-back rate having a value sufficient to prevent the memory buffer from filling during time periods shorter than a refresh cycle of each of the cache-rate and write-back rate parameters and wherein the write back rate reduces the service rate of the memory buffer by an amount up to a value equal to the maximum write back rate.

12. The method of claim 1 wherein the memory store of the first type is an electromechanical type memory.

13. The method of claim 1 wherein the memory store of the second type is a flash type memory.

14. The method of claim 1 comprising monitoring usage of the memory store of the first type and adjusting cache rate parameter in response to that monitored usage.

15. The method of claim 14 wherein the monitored usage comprises at least one of data writing or data reading requests to the memory store of the first type.

16. The method of claim 15 wherein the monitored usage indicates demand for accelerated reading of data from the memory store of the first type, the adjusting the cache rate parameter effecting an increased usage of the memory store of the second type in response to that demand for accelerated reading.

17. The method of claim 1 comprising monitoring a wear-level parameter of the memory store of the second type, the wear-level parameter being a value related to a lifetime storage capacity of the memory store of the second type, the method further comprising adjusting the cache-rate parameter in response to variations in the monitored wear-level parameter.

18. The method of claim 17 wherein the wear-level parameter is a function of usage of the memory store of the second type, the method comprising monitoring usage of the memory store of the second type and based on a projected deviation from a preconfigured wear rate threshold modifying future usage of the memory store of the second type in read or write operations.

19. A non-transitory computer program storage device readable by a processor of a computer system and tangibly embodying a program of instructions executable by the processor of the computer system to perform method steps for reading data from memory, the method steps comprising:

monitoring write operations to the memory buffer, the write operations being resultant from incoming data to the system, the memory buffer having a known capacity of data that it can store;

monitoring a service rate of the memory buffer, the service rate being the rate at which the incoming data is written from the memory buffer to at least one of the memory store of the first type and the memory store of the second type;

using the monitored write operations and service rate to dynamically determine a cache-rate parameter, the cache rate parameter identifying a proportion of the data in the memory buffer to be written to each of the memory store of the first type and the memory store of the second type, the determined cache rate parameter being varied to ensure that the service rate of the memory buffer is at least equal to the rate of incoming data to the memory buffer;

using the cache-rate parameter to selectively read the data from the memory buffer and write that data to one of the memory store of the first type and memory store of the second type.

20. A computer system comprising:

a memory buffer defining a network interface for receiving network traffic;

a memory store of a first type and a memory store of a second type, the second type being different to the first type;

at least one processor;

the system being configured to selectively service the memory buffer by selectively writing data from the memory buffer to each of the memory store of the first type and memory store of the second type by:
- monitoring write operations to the memory buffer, the write operations being resultant from incoming data to the system, the memory buffer having a known capacity of data that it can store;
- monitoring a service rate of the memory buffer, the service rate being the rate at which the incoming data is written from the memory buffer to at least one of the memory store of the first type and the memory store of the second type
- using the monitored write operations and service rate to dynamically determine a cache-rate parameter, the cache rate parameter identifying a proportion of the data in the memory buffer to be written to each of the memory store of the first type and the memory store of the second type, the determined cache rate parameter being varied to ensure that the service rate of the memory buffer is at least equal to the rate of incoming data to the memory buffer;
- using the determined cache-rate parameter to selectively read the data from the memory buffer and write that data to one of the memory store of the first type and memory store of the second type.

21. The system of claim 20 wherein the memory store of the first type is an electromechanical type memory and the memory store of the second type is a flash type memory.

22. The system of claim 20 wherein the system is further configured to:
- monitor a wear-level parameter of the memory store of the second type, the wear-level parameter being a value related to a lifetime storage capacity of the memory store of the second type, and adjust the cache-rate parameter in response to variations in the monitored wear-level parameter; wherein the wear-level parameter is a function of usage of the memory store of the second type, the method comprising monitoring usage of the memory store of the second type and based on a projected deviation from a preconfigured wear rate threshold modifying future usage of the memory store of the second type in read or write operations.

* * * * *